(12) United States Patent  
Frisken

(10) Patent No.: US 7,397,980 B2  
(45) Date of Patent: Jul. 8, 2008

(54) DUAL-SOURCE OPTICAL WAVELENGTH PROCESSOR

(75) Inventor: Steven James Frisken, Vaucluse (AU)

(73) Assignee: Optium Australia PTY Limited, Evenleigh, New South Wales (AU)

( * ) Notice: Subject to any disclaimer, the term of this patent is extended or adjusted under 35 U.S.C. 154(b) by 107 days.

(21) Appl. No.: 10/868,521

(22) Filed: Jun. 14, 2004

(65) Prior Publication Data

US 2005/0276537 A1    Dec. 15, 2005

(51) Int. Cl.  
*G02B 6/28* (2006.01)

(52) U.S. Cl. .............................. 385/24; 385/15; 385/17; 385/37

(58) Field of Classification Search .................... 385/24  
See application file for complete search history.

(56) References Cited

U.S. PATENT DOCUMENTS

| 6,917,396 | B2 * | 7/2005 | Hiraishi et al. ................. 349/64 |
| 2003/0021526 | A1 * | 1/2003 | Bouevitch ..................... 385/24 |

* cited by examiner

*Primary Examiner*—Frank G Font  
*Assistant Examiner*—Erin D Chiem  
(74) *Attorney, Agent, or Firm*—Kurt Rauschenbach; Rauschenbach Patent Law Group, LLC

(57) ABSTRACT

An optical signal manipulation system including: a series of ports for carrying a series of optical signals to be manipulated; a spatial separating means for spatially separating at least a first and a second group of light from the series of optical signals; wavelength dispersion element subsequently spatially separating wavelengths of the first and second series; wavelength processing means for processing separated wavelengths of the first and second series.

16 Claims, 7 Drawing Sheets

DUAL-SOURCE OPTICAL WAVELENGTH PROCESSOR

FIELD OF THE INVENTION

The present invention relates generally to optical switches, and in particular to a reconfigurable fibre optic wavelength switch that can operate independently on individual wavelength channels contained in optical signals originating from either of two input sources.

BACKGROUND OF THE INVENTION

The recent growth in the demand for broadband services has resulted in a pressing need for increased capacity on existing communication channels. The increased bandwidth of fibre optic communication fibres is still often insufficient to cope with this demand without utilising the ability of these fibres to carry large numbers of individual communication channels each identified by the particular wavelength of the light. This technique is known as dense wavelength division multiplexing (DWDM). The disadvantage of this technique is that the increasing density of wavelength channels places increasing demand on network functionality for connecting the individual channels to individual destination points on a dynamic basis, and for the ability to add or drop an individual wavelength channel into or out of the optical signal. Currently these functions are primarily performed by electronic techniques but the demand for increased network speed calls for these functions to be performed in the optical domain.

The use of wavelength selective switching for applications of optical cross-connects has attracted much interest because of the goal of fully flexible networks, where the paths of each wavelength can be reconfigured to allow for arbitrary connection between nodes with the capacity appropriate for that link at a particular point in time. Although this goal is still valid, it is clear that optical networks will evolve to this level of sophistication in a number of stages. The first stage of the evolution is likely to be that of a reconfigurable add/drop node where a number of channels can be dropped or and added from the main path, whose number and wavelength can be varied over time—either as the network evolves or dynamically as the traffic demands vary.

A further functionality demanded by optical communications networks is the ability to route incoming signals from two origins in the same fashion independently of each other in a single device. This immediately halves the device count required at any particular location, without the loss of functionality in the adding and dropping of channels from either source.

This present invention is directed to applications such as dual-source reconfigurable optical add/drop multiplexer (ROADM) networks, dual-source wavelength reconfigurable cross-connects referred to generically as Wavelength Selective Switches (WSS), dual-source dynamic channel equalisation (DCE) and for single-source devices for correction of polarisation-dependant loss (PDL) mechanisms.

The characteristics of a wavelength selective element which is ideal for the applications of Optical Add/Drop and Wavelength Selective Switching can be summarized follows:
 i) scalable to multiple fibre ports;
 ii) one channel per port or multiple channels per port operation;
 iii) reconfiguration of wavelength selectivity to different grids e.g. 50 GHz or 100 GHz or a combination of both;
 iv) low optical impairment of the express path;
 v) low losses on the drop and express paths;
 vi) ability to add and drop wavelengths simultaneously;
 vii) ability to be reconfigured between any ports or between any wavelengths without causing transient impairments to the other ports;
 viii) equalisation of optical power levels on express path (OADM) or all paths (WSS);
 ix) provision of shared optical power between ports for a given wavelength (broadcast mode);
 x) flat optical passband to prevent spectral narrowing;
 xi) power off configurations that leave the express path of an OADM undisturbed; and
 xii) small power and voltage and size requirements.

In reviewing the many technologies that have been applied it is necessary to generalize somewhat, but the following observations can be made.

Two basic approaches have been made for the OADM and WSS applications.
 i) The first has been based on wavelength blocking elements combined with a broadcast and select architecture. This is an optical power intensive architecture, which can provide for channel equalization and reconfiguration of wavelength selectivity, but is not scalable to multiple ports, has very high loss and because of the many auxiliary components such as wavelength tuneable filters has a large power and footprint requirement.
 ii) Wavelength switches have been proposed for OADMs, but do not naturally provide for channel equalization, the channel by channel switching in general leads to dispersion and loss narrowing of optical channels, and in the case of multiple port switches it is generally not possible to switch between ports without causing impairment (a hit) on intermediate ports. In addition the channel spacing cannot be dynamically reconfigured. Tuneable 3-port filters have also been proposed having a lack of impairment to the express paths but do not scale easily to multiple ports and may suffer from transient wavelength hits during tuning. Tuneable components are usually locked to a particular bandwidth which cannot be varied. In addition poor isolation of tunable 3 ports means they are less applicable to many add/drop applications which demand high through path isolation.

One technology that has been applied to optical cross connects has become known as 3-D MEMS utilises small mirror structures which act on a beam of light to direct it from one port to another. Examples of this art are provided in U.S. Pat. Nos. 5,960,133 and 6,501,877. The ports are usually arranged in a 2-dimensional matrix and a corresponding element of the 2-dimensional array of mirrors can tilt in two axes to couple between any one of the ports. Usually two arrays of these mirrors are required to couple the light efficiently and because of the high degree of analogue control required structures based on this technology have proved to be extremely difficult to realize in practice and there are few examples of commercially successful offerings. In this type of structure, a separate component is required to separate each wavelength division multiplexed (WDM) input fibre to corresponding single channel/single fibre inputs.

One of the most promising platforms for wavelength routing application relies on the principle of dispersing the channels spatially and operating on the different wavelengths, either with a switching element or attenuation element. These technologies are advantageous in that the switching element is integrated with the wavelength dispersive element—greatly simplifying the implementation. The trade-off is that in general the switching is more limited, with most implementations demonstrated to date being limited to small port counts—and the routing between ports is not arbitrary. In general a diffraction grating is used for micro-optic implementations or an array waveguide grating for waveguide applications. Most of the switching applications have been based on MEMS micro mirrors fabricated in silicon and based on a tilt actuation in one dimension. The difficulty with this approach has been that to achieve the wavelength resolution required when the angular dispersion is mapped to a displacement. In such cases, an image of the fibre (with or without magnification) is mapped onto the tilt mirror array. In order to couple the light into a second port, additional optical elements are required that convert the angle into a displacement. Different approaches to this have included retroreflection cubes wedges (U.S. Pat. No. 6,097,519) which provide discrete displacements or Angle to Displacement elements (U.S. Pat. No. 6,560,000) which can provide continuous mapping using optical power provisioned at the Rayleigh length of the image. In all of these cases, in order to switch between ports, the tilt mirror needs to pass through the angles corresponding to intermediate ports. In addition, the number of ports is limited in each of these cases by the numerical aperture of the fibre as each of the different switch positions are discriminated by angles. For a fibre with a numerical aperture of 0.1, a switch which can tilt by +−12 degrees could not distinguish 8 different switch positions. One approach that can be used is to decrease the numerical aperture through the use of thermally expanded cores or micro lenses—but this is done at the expense of wavelength resolution.

An alternative has been to use polarization to switch between ports. Obviously this is most appropriate to switching between 2 ports corresponding to the 2 polarisation states. Such a switch is described in Patel (J. S. Patel and Y. Silverberg, IEEE Photonics Technology Letters Vol. 7 No. 5, 1995, pp. 514-516) where an optical dispersion element (in this case a grating) is used to separate an optical signal into spatially separated wavelength channels incident onto a liquid crystal spatial light modulator (LC SLM). The SLM is then configured to rotate the polarisation of the light of a desired wavelength channel by 90° which causes the light to be deflected from the main channel by a birefringent crystal. The wavelengths are then recombined by a second grating element forming two spatially-displaced outputs: one containing the wavelength channels acted on by the LC SLM, and the second output containing the remaining wavelength channels. Since these types of switches are limited to only two polarisation states, they are not readily scalable, though more complicated schemes can be envisaged to allow for switching between multiple ports. With polarization switching, also, dynamic equalization of channels can only be done at the expense of the rejected light being channelled into the second fibre—so it is not applicable to equalization of the express path whilst dropping a number of wavelengths.

A better alternative to switch between multiple ports has been the use of optical beam deflectors such as MEMS mirror arrays or LC SLMs. These devices deflect the light through free space, thus allowing multiple signal beams to be simultaneously interconnected without cross-talk between data channels.

An example of a MEMS-based device is taught by Waverka (U.S. Pat. No. 6,501,877) which disperses the individual wavelength channels with a diffraction grating. The individual channels are each then focused on to spatially separated elements of the MEMS array which imparts an angular displacement on the beams. A retroreflection device is used to convert the angular displacement to a lateral offset, that when passed back through the optical system translates into a coupling to the desired output port. In this implementation the offset states are quantised and determined by the angles of the retroreflection prism.

A similar technique is taught in U.S. Pat. No. 6,707,959 by Ducellier where a particular spatially separated wavelength channel is acted upon by a deflector array implemented either using a MEMS device or a transmissive LC deflector. A schematic block diagram of this device is shown in FIG. 1. Ducellier introduces an improvement over Waverka by having the angle to offset (ATO) element 1 being able to translate continuously for an arbitrary state by placing an angle to offset lens at the Rayleigh point of the optical array 2. The angular array is then transmitted through a standard 4-f lens design (telecentric telescope) using a spherical reflector 3 to the deflection array 4 with preservation of the angular multiplex. The individual wavelength channels in the optical signal are separated by an optical dispersion element 5 at the telecentric point of the optical system.

The deflection array 4 can be operated in either reflective or transmissive mode and (similarly to Waverka and Patel) provides a deflection of a desired wavelength channel perpendicularly to the wavelength dispersion direction. The deflection is such that an ATO element at the output array translates the new angular multiplex into an offset corresponding to the desired output port. In this system, the input array, the optical dispersion element, the deflection array, and the output array all lie in the same focal plane due to the spherical symmetry of the optics. The disadvantage of this is that large deflection angles are required to switch between fibre ports and a requirement for large numerical aperture optics. The requirement also of a duplicate optical system in the transmissive deflection array embodiment places severe restrictions on the compactness and cost of the final device.

Additionally, none of the devices described above can operate on the light from two input sources or two groupings of light having the same wavelength channels independently. Due to the existence of polarisation dependent loss and polarisation mode dispersion—it is often convenient to consider two orthogonal polarisation states as two separate sources and it could be advantageous to act on these separately.

Various techniques have been proposed for the correction of polarisation dependent loss (PDL) in optical communication systems on a wavelength basis such as those discussed by Roberts (U.S. Patent Application Publication 2004/0004755). These techniques however are only applicable to a single optical fibre and operate in transmission mode only. To our knowledge, there have been no techniques have been proposed or demonstrated to provide broadband PDL correction for multiple optical fibre devices or in a switching architecture.

It is an object of the present invention to overcome or ameliorate at least some of the disadvantages of the prior art by providing a reconfigurable optical add/drop multiplexer and wavelength selective switch capable of independently operating on arbitrary wavelength channels contained in light from two distinct sources or groups.

SUMMARY OF THE INVENTION

In accordance with a first aspect of the present invention, there is provided an optical signal manipulation system including: a series of ports for carrying a series of optical signals to be manipulated; a spatial separating means for spatially separating at least a first and a second group of light from the series of optical signals; wavelength dispersion element subsequently spatially separating wavelengths of the first and second series; wavelength processing means for separately processing separated wavelengths of the first and second series.

The spatial separating means preferably can include a polarisation manipulation element separating a first and second series of predetermined polarisations from predetermined ones of the ports and projecting the first series in a first angular direction and the second series in a second angular direction. The spatial separating means preferably can also include a series of optical power elements offset from the ports separating at least a first and second series of predetermined optical signals from predetermined ones of the ports and projecting the first series in a first angular direction and the second series in a second angular direction.

Signals processed by the wavelength processing means are preferably transmitted back through the wavelength dispersion element, the polarisation manipulation element for output at the optical signal ports. The particular port to which particular wavelengths are preferably output can be determined by the processing carried out by the wavelength processing means.

The wavelength processing means preferably can include a series of zones and the wavelength processing means separately manipulates the phase front of light striking each of the zones in order to control the output destination of wavelengths striking a particular zone. The wavelength processing means can comprise a spatial light modulator having a plurality of independently addressable pixels with the pixels being manipulated in a predetermined manner so as to manipulate the phase front striking a corresponding zone.

The optical signals received by the wavelength processing means are preferably in the form of wavelength separated elongated bands. The wavelength separated elongated bands are preferably substantially collimated along their major axis and substantially focused along their minor axis. The ratio of the width of the major axis to the width of the minor axis of the bands can be equal to or greater than 5. The width of the bands major axis can be substantially 700 microns and the width of a bands minor axis can be substantially 20 microns.

Preferably, the first series forms a first row of wavelength separated elongated bands and the second series forms a second row of wavelength separated elongated bands. The first and second row are preferably substantially parallel. The first series of predetermined polarisations can be derived from a first polarisation state of the optical signals and the second series of predetermined polarisations can be derived from a second substantially orthogonal polarisation state of the optical signals. Alternatively, the first series of predetermined polarisations can be derived from orthogonal polarisations of a first series of optical signals and the second series of predetermined polarisations can be derived from orthogonal polarisations of a second series of optical signals.

In one embodiment, the wavelength processing means can comprise a liquid crystal display device having a series of light modulating pixels formed thereon. The optical signals traversing the wavelength dispersion element are preferably substantially polarisation aligned. The light emitted from the optical signal ports passes through a numerical aperture modifying means before traversing the polarisation manipulation element. The numerical aperture of the light from the optical signal ports can be modified by a series of lenses having a pitch substantially in accordance with the pitch of the optical signal ports.

The polarisation manipulation element can comprise a first polarisation separation element for spatially separating orthogonal polarisations and a second polarisation deflection element for angularly deflecting an optical signal in accordance with the polarisation state of the signal. The polarisation manipulation element can also include, in series, a polarisation separation element for spatially separating orthogonal polarisations, a polarisation alignment element for aligning the separated orthogonal polarisations and a polarisation deflection element for angularly deflecting an optical signal in accordance with the polarisation state of the signal.

The system can also include a first optical power element for collimating the light emitted from the polarisation manipulation element onto the wavelength dispersion element and a second optical power element for focusing the light emitted from the wavelength dispersion element onto the wavelength processing means. The first and second optical power elements can comprise of reflective mirror surfaces with the first optical power element having optical power in a first optical axis only and the second optical power element having optical power in a first optical axis only. The system can also include a third optical power element for collimating the light emitted from the polarisation manipulation element onto the wavelength processing means. The third optical power element can comprise of a lens that has optical power in a second optical axis only. The second optical axis can be orthogonal to the first optical axis.

In accordance with a further aspect of the present invention, there is provided an optical signal manipulation system including: a series of optical signal ports; numerical aperture modifying means for modifying the numerical aperture of light emitted from the optical signal ports to form modified optical signals; polarisation manipulation means for imparting a different angular projection to substantially orthogonal polarisation states of the modified optical signals; polarisation alignment means for substantially aligning the polarisation state of the substantially orthogonal polarisation states; wavelength dispersion element for angularly dispersing by wavelength the aligned modified optical signals; a wavelength control element having a series of elongated control zones for receipt and manipulation of a region of the wavelength dispersed optical signals.

The different substantially orthogonal polarisation states are preferably manipulated by different elongated control zones. A first polarisation state can be manipulated by a first series of substantially adjacent control zones and a second orthogonal polarisation state can be manipulated by a second series of substantially adjacent control zones. The first and second series of substantially adjacent control zones are preferably substantially parallel with one another. Light from the wavelength control element can be projecting through a second wavelength dispersion element so as to combine wavelengths of the first and second series; Light from the second wavelength dispersion element can be projected through a second polarisation manipulation element for combining the orthogonal polarisations to output at predetermined optical signal ports. Light projected from the optical signal ports to the wavelength control element can undergo at least two reflections on reflective optical power surfaces.

The wavelength dispersion element preferably can include a diffraction grating mounted on an optical prism. Light from the polarisation manipulation means and light from the wavelength control element can strike the prism substantially at Brewster's angle. The path lengths of light in the first and second polarisation states can be substantially equalised on traversal through the prism.

In accordance with a further aspect of the present invention, there is provided an optical system including: a series of optical signal ports; numerical aperture modifying means for modifying the numerical aperture of light emitted from the optical signal ports to form modified optical signals; a polarisation alignment means for substantially aligning the polarisation state of substantially orthogonal polarisation states from the optical signal ports; wavelength dispersion element for angularly dispersing by wavelength the aligned modified optical signals; an optical phase control matrix for receipt and manipulation of a region of the wavelength dispersed optical signals; a series of optical power elements for creating a spatial intensity overlap on the wavelength control element between projections from a first selected optical signal port and a second selected optical signal port.

The optical phase control matrix preferably can include a series of elongated control zones. Each the control zone of the optical phase control matrix can comprise a plurality of individually addressable pixels with each of the pixel modifying the phase of light passing through it.

The projections of optical signals at the optical phase control matrix along a first optical axis are preferably in the image plane of the series of optical power elements. The projections of optical signals at the optical phase control matrix along a second optical axis are preferably substantially in the fourier or telecentric plane of the series of optical power elements. The first optical axis can be substantially orthogonal to the second optical axis. Signals from the first selected optical signal port received by the optical phase control matrix are preferably manipulated and transmitted back through the wavelength dispersion element for output at the second selected optical signal port.

The optical system in the first optical axis can be substantially 2n times the focal length of the series of optical power elements in the first optical axis, where n can be a positive integer. The optical system in the second optical axis can be substantially 2m times the focal length of the series of optical power elements in the second optical axis where m can be a positive integer. In one embodiment n can be an even integer and m can be an odd integer.

The optical signals received by the optical phase control matrix are preferably in the form of wavelength separated elongated bands. Each wavelength separated elongated band aligns with an independent one of the elongated control zones. The minor axis of the elongated bands lies in the first optical axis and the major axis of the elongated bands lies in the second optical axis.

The reconfigurable dual-source optical wavelength processor of the present device includes:
  a series of optical ports for generating and/or receiving an optical beam;
  an optical phased-matrix coupling (OPMC) device for receiving and reflecting said beams;
  a series of optical power elements positioned between said ports and said OPMC device to provide a spatial overlap between the said beams from said ports on the phase coupling device;
  a series of optical path separating elements arrayed in such a way as to create at least two independent groups of light;
  an optical dispersion element designed to separate at least a first and second wavelengths of light; and wherein said optical phased-matrix device provides for individual control of at least a first and second wavelength's coupling efficiency between an input port and at least one output port.

The device in its preferred embodiments can include:
  a series of optical ports which can include optical fibre arrays;
  a series of optical ports where the optical fibre arrays are single mode fibres;
  a series of optical ports where the optical fibre array includes at least a first input port, a first output port, a first add port and a first drop port;
  a series of optical ports where the optical fibre array includes a plurality of add ports and/or a plurality of drop ports;
  a series of optical ports where the optical fibre array includes a second input ports, a second output port;
  a series of optical ports where the optical fibre array includes a plurality of input ports, and a plurality of output port;
  a series of optical power elements which can include spherical microlens arrays for altering the numerical aperture of each of the optical ports;
  optical power elements including cylindrical lenses with a first focal length and cylindrical mirrors with a second focal length for projecting light from the ports on the optical phased-array coupling means comprising at least a spatially separated first group of spatially dispersed wavelength channels, each wavelength channel being substantially collimated in one axis and substantially focused in the orthogonal axis;
  polarisation diversity elements including a birefringent walk-off crystal composite λ/2 waveplates for 1550 nm light, compensating birefringent wedges, and/or Faraday rotators;
  an optical dispersion element which is a Carpenter's Prism (grism) operating in the reflective mode at near Littrow condition, and a wedge angle substantially at Brewster's angle of the incident light: and
  an optical phased matrix coupling (OPMC) means providing 2-dimensional optical phase only or phase and optical amplitude such as can be provided by a liquid crystal on silicon (LCOS) spatial light modulator (SLM).

Possible practical applications of a dual-source optical switch are:

Device 1.
  A Polarisation Dependent Loss (PDL) correcting Reconfigurable Optical Add/Drop Multiplexer (ROADM) where light from an input optical fibre port is separated into two beams with orthogonal polarisation states, with each beam being dispersed into spatially separated wavelength channels, and the two groups of spatially separated wavelength channels being projected onto spatially separated regions of a liquid crystal spatial light modulator. The orthogonal polarisation states of a particular wavelength channel can then be addressed independently which allows for equalisation of the PDL of the wavelength channel before being directed to a choice of output fibre ports (either an express output port or a drop port).

Device 2.
  A dual-source ROADM consisting of two independent groups of fibre ports, with each group as a minimum containing an input port and an express output port, and optionally a drop port. (In practise each of the independent ROADMs can include a plurality of add and drop ports.) The light corresponding to the paths into and out of the ports corresponding to either group can be tagged, for example by assigning each independent device to an orthogonal polarisation state, spatially separating the light from the two polarisations and imaging the light from each polarisation onto a spatially separated region of the OPMC to act on the channels from each device independently;

DETAILED DESCRIPTION OF PREFERRED EMBODIMENTS

The preferred embodiment provides an optical switching device that can operate on individual spatially dispersed wavelength channels contained in an optical signal that originate from either of two input sources. The input sources can be:

a) two unrelated sources possibly delivered to the switch via optical fibre;

b) two orthogonally polarised beams originating from a single source, possibly delivered to the switch via optical fibre;

c) a plurality of input sources, possibly delivered to the switch via optical fibre, separated into orthogonal polarisation states such that the polarisation states of a particular wavelength channel can be acted upon independently;

d) a plurality of input sources, possibly delivered to the switch via optical fibre, optically tagged in a fashion that defines two distinct groups, for example by assigning each of the input sources one of two orthogonal polarisation states.

Figure 1:
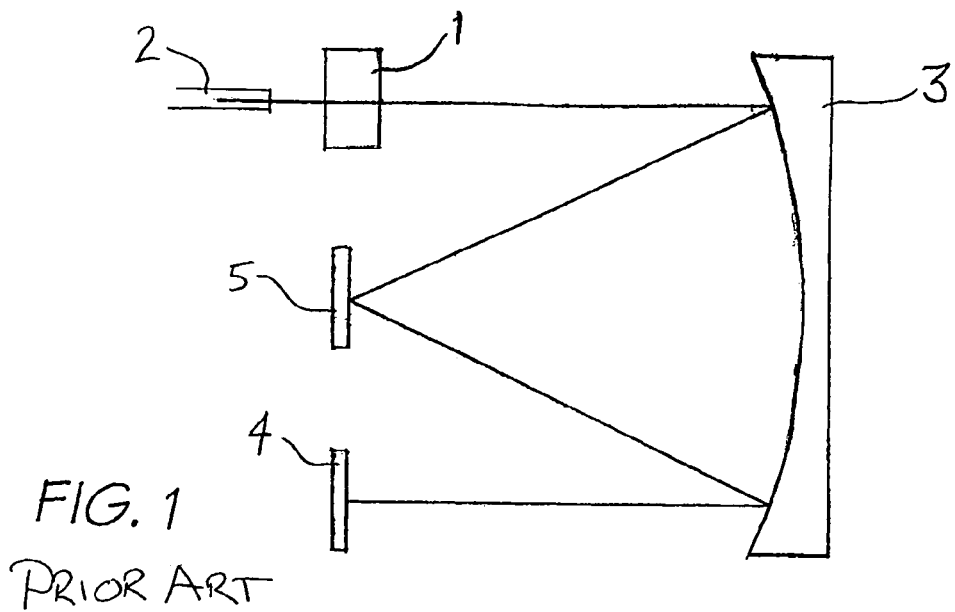
FIG. 1 is a schematic diagram of a prior art optical add/drop multiplexer.
Figure 2:
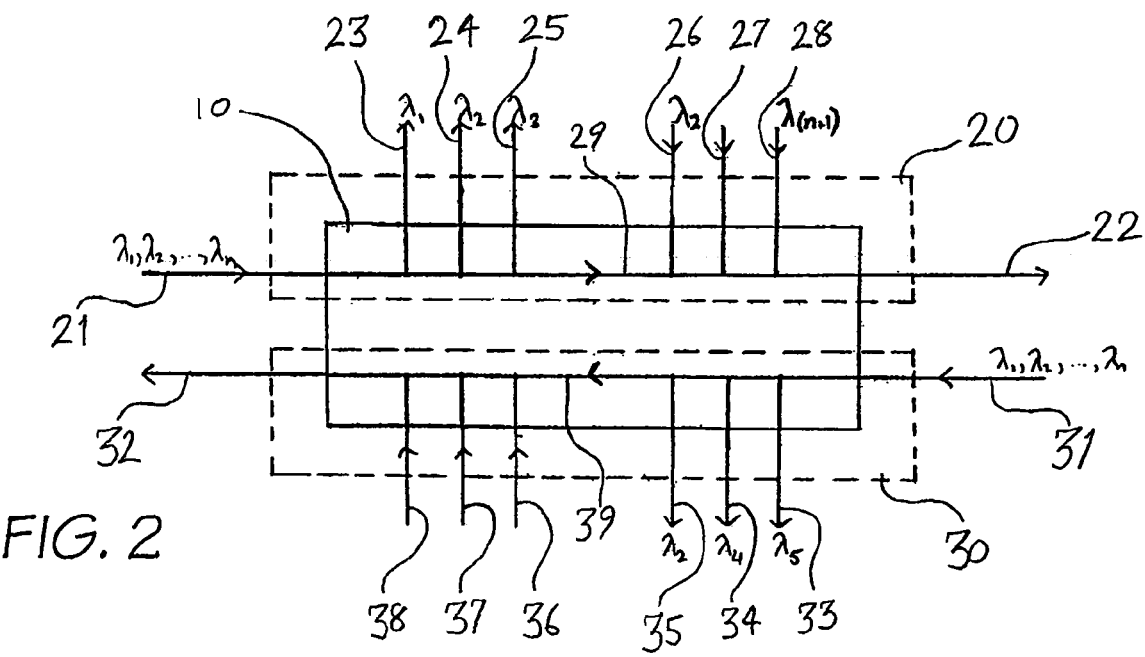
FIG. 2 is a block schematic of a dual-source optical wavelength processor in accordance with the present invention.

FIG. 2 shows a schematic block diagram of a dual-source optical wavelength processor constructed in accordance with the preferred embodiment. The wavelength processor device 10 is virtually divided into two distinct devices 20 and 30 where the operation of one is entirely independent of the other. Each of the virtual devices 20 and 30 acts in the preferred embodiment can act as an independent reconfigurable optical add-drop multiplexer (OADM). That is, each of the virtual devices 20 and 30 includes an input ports 21 and 31 respectively, each input port delivering an optical signal to the device, where each signal contains a plurality of channels $\lambda_1$, $\lambda_2$, ..., $\lambda_n$ distinguished by the centre wavelength of the channel. Each of the virtual devices also includes an output port 22 and 32 respectively. Virtual device 20 includes a plurality of drop ports 23, 24 and 25, and a plurality of add ports 26, 27 and 28. Virtual device 30 includes a plurality of drop ports 33, 34 and 35, and a plurality of add ports 36, 37 and 38. Three drop and three add ports are shown in the Figure for each of the virtual devices 20 and 30, however, more or less can be implemented in other embodiments as required. For a signal arriving at input port 21, virtual device 20 can be configured to drop an arbitrary selection of the wavelength channels contained therein onto drop ports 23-25, for example $\lambda_1$, $\lambda_2$ and $\lambda_3$. Simultaneously, for a signal arriving at input port 31, virtual device 30 can be configured to drop a different arbitrary selection of the wavelength channels contained therein onto drop ports 33-35, for example $\lambda_2$, $\lambda_3$ and $\lambda_5$. All of the other wavelength channels contained in either signal on port 21 or 31 that are not dropped onto the drop ports are directed to the corresponding output port 22 or 32 respectively via the corresponding express paths 29 or 39 of the device. As is known in the operation of an OADM, the add ports of each of the virtual devices can be used to add signal onto the express path of the device to be transmitted to the output port, however in the case of the present embodiment, the added signals can either be of the same wavelength as any of the dropped signals or a different wavelength entirely for example, the wavelength channels added to virtual device 20 can be $\lambda_2$ and $\lambda_{(n+1)}$.

Device 1

Figure 3:
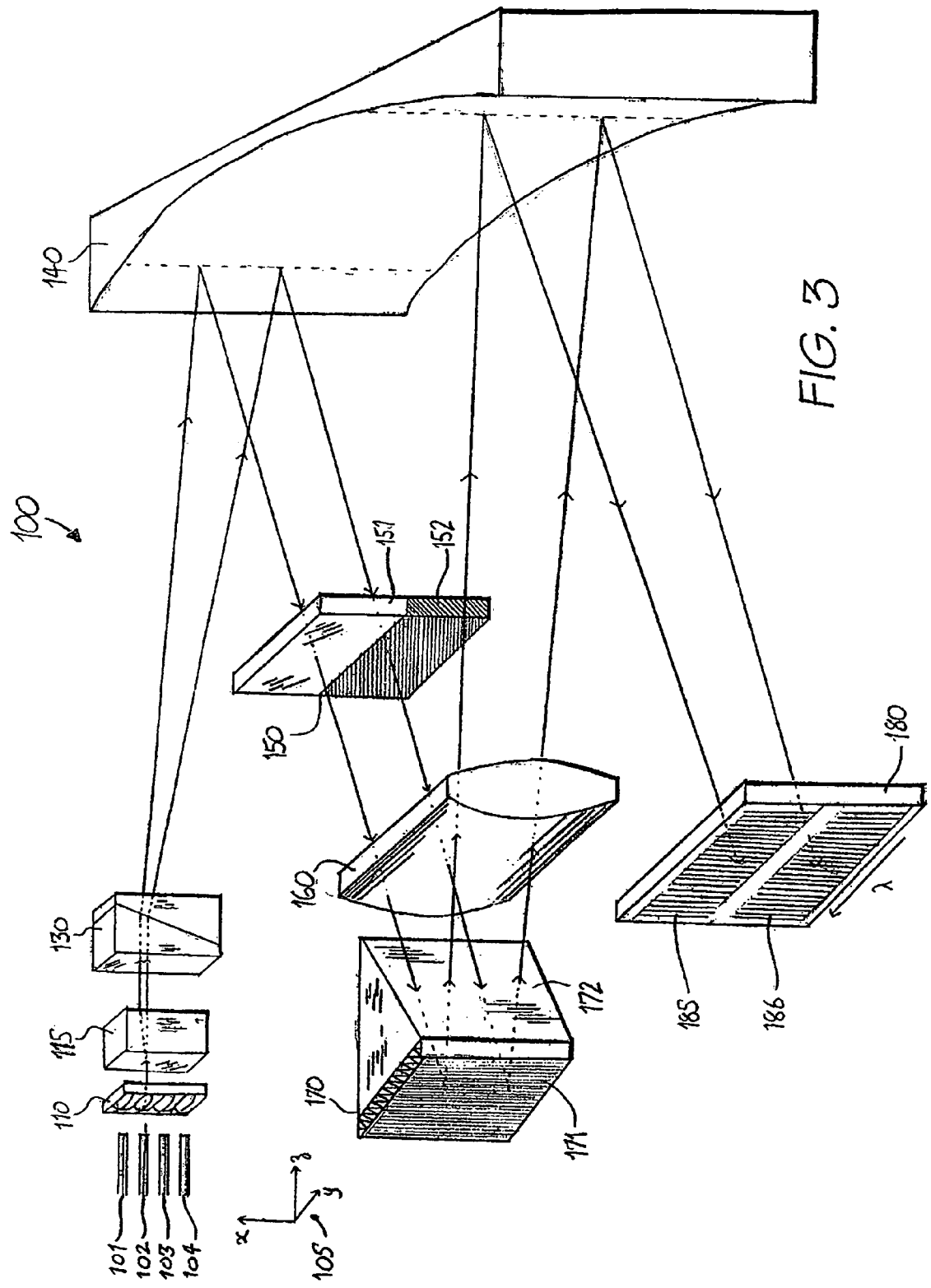
FIG. 3 is a schematic view of a first embodiment of a dual-source optical wavelength processor in accordance with the present invention.

The preferred embodiment of the Device 1 above is shown in schematic form in FIG. 3. The device 100 includes an array of input and output ports consisting of 4 fibres (101-104) comprising a ROADM where fibre port 102 is designated as the express Input port, fibre port 103, the express Output port, fibre port 101 as a first Add port, and fibre port 104 as a first Drop port. A device such as this in practice may also include a plurality of additional Add and Drop ports (not shown). The fibres are all aligned vertically in what will be referred to as the x-dimension of the 3-axis 105 and separated by about 250 µm.

The output from the fibres is firstly incident on a microlens array of spherical lenses spaced with a separation corresponding to the fibre separation. The focal length of the lens is chosen to be 500 µm positioned to form beam waists of approximately 50 µm diameter. The effect of the spherical microlens array 110 is to decrease the numerical aperture (NA) of the fibres say from their single mode value of 0.1 to about 0.02. This relaxes the requirements on the optical quality of the subsequent optical elements.

The beam emerging from the input fibres is split in the x direction into two polarization states (v in the x-dimension and h in the y-dimension) by the walk off crystal 115 of thickness 1.25 mm. The result of the walk-ff crystal if one were to look back at the fibre array in the −z-direction would be an image of 8 fibres separated by 125 μm.

The beams then enter a birefringent wedge (BRW) element 130 which is shown as a compensating element (CBRW) to give equal path lengths between the fibre ports. The CBRW works on the principle of "double refraction" and causes an angular offset to be imparted on the beams in one polarisation state with respect to the other. In FIG. 3, this offset is in the vertical or x-dimension. In other embodiments, the CBRW 130 can be a simple non-compensating element however this would correspond to unequal path lengths from each of the fibre ports resulting in a spatial offset on refocusing onto an output port, ultimately affecting the efficiency of the return path.

Figure 4:
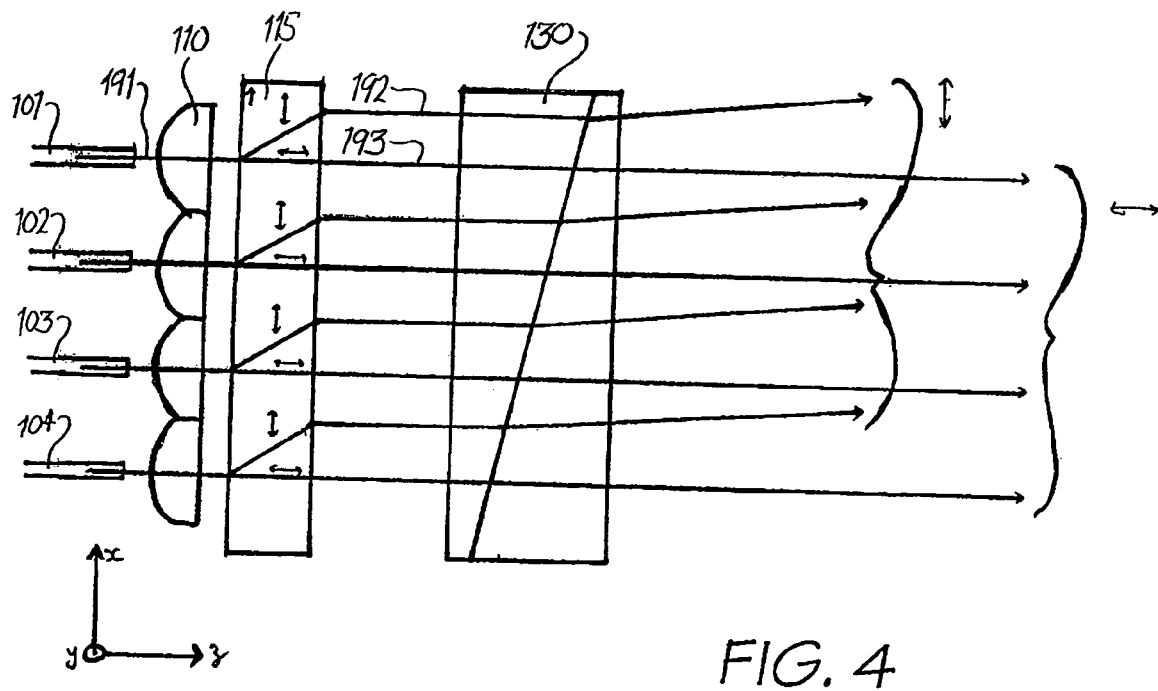
FIG. 4 is a detail schematic view of the front end polarisation tagging mechanism of the first embodiment.

FIG. 4 shows the fibre ports 101-104, the NA modifying optical power microlens array 110, the birefringent walk-off element 115 and the CBRW 130. An output beam 191 from fibre 101 is split into two beams 192 and 193 by element 115, where beam 192 is in the vertical or v-polarisation state and beam 193 is in the horizontal or h-polarisation state. The now polarisation tagged beams enter the CBRW 130 which imparts an angular offset on the beams in one polarisation state with respect to the other. This angular offset is in the vertical or x-dimension and propagates through the optical train to result in a spatial separation between beams of different polarisations at the OPMC as will be seen.

Returning to FIG. 3, each of the input beams is then projected to a first y-cylindrical mirror 140 with a focal length of 5 cm which provides collimation in the y axis. The angular misalignment between the v-polarised and h-polarised beams is unaffected and continues to separate spatially. The reflected beams are then projected onto a polarisation equalisation element 150 where the spatially separated v- and h-polarisations strike the element 150 in the upper and lower halves respectively. The element 150 is a composite λ/2 waveplate where the entire upper half 151 is a crystal-quartz waveplate with its optical axis at 45° with rotates the v-polarised beams into the h-polarisation, and the lower half 152 is simple glass which does not alter the polarisation state of the originally h-polarised beams. Equalisation of the polarisations states in this manner ensures efficient operation of the subsequent wavelength dispersing element and the spatial light modulator in the subsequent optical path.

The beams are then directed to a cylindrical lens 160 having optical power in the x-dimension with a focal length of 20 cm before being incident on a wavelength dispersive element which in this case is a wedged grating prism combination 170, known commonly as a grism or Carpenter's prism, operating in the reflective orientation and aligned at the near-Littrow condition. The grism is a combination of two common optical elements, namely a diffraction grating 171 which can be of either the transmission or reflection type, and a wedged prism 172, which are bonded together. In the embodiments described here, 171 is a reflection grating and the beams traverse a double pass through the prism 172. In an alternative embodiment a grism element is used with the grating operating in transmission mode. In other embodiments of the system, the wavelength dispersive element 170 can be a simple grating operating in the near-Littrow reflective state for the 1.5 μm wavelength of the light (1200 lines/mm) emerging from the input fibre ports, however the addition of the wedged prism bonded to the grating adds significant advantages to the efficiency of the system, being:

a) equalisation of the optical path lengths in the y-dimension;
b) by suitable selection of the refractive index and input face angles the dispersion characteristics (in particular the angular dependence in the x-dimension) of the grating can be controlled and hence correct for effects such as conical diffraction from the grating resulting from non-orthogonal components of the beams striking the grating (since the prism has the opposite angular dependence to that of the grating) which ultimately results in errors in the focused position at the fibre ports on the return paths of the beams;
c) modification of the effective wavelengths of the beams as they strike the grating to enable the use of higher resolution gratings for more efficient dispersion i.e. a 1.5 μm beam in air requires the use of gratings with ~1200 lines/mm whereas in the prism with refractive index ~1.5, the effective wavelength is ~1 μm and thus gratings with 1700 lines/mm can be used.

In the preferred embodiments, the angle of the prism is such that the light beams (which are in the p-polarisation state with respect to the prism) are incident on the prism surface substantially at the Brewster angle to avoid loss of the light due to reflection from the prism interface which is then lost to the system. In the preferred embodiments, the light which has travelled through the prism strikes the grating in the s-polarisation state (with respect to the grating). In the preferred embodiments, the characteristics of the prism 172 are designed to substantially compensate for the chirp of the grating 171, which in turn substantially eliminates errors due to conical diffraction in the image of the light beams at the output fibre ports.

The now wavelength-dispersed beams then pass back through the prism element of the grism 170 and again are passed through the cylindrical lens 160. After the second pass of the x-dimension lens 160 the now diffracted beam is collimated in the x direction—the combined effect of the double pass of lens 160 being a lens with focal length of approximately 10 cm, being twice the focal length of the first cylindrical mirror 140. This condition ensures that the grating acts in the telecentric or Fourier plane of the beams in the y-dimension.

On exiting from the cylindrical lens 160 the now collimated and spatially separated (in the x-dimension) beams pass by the polarisation equalisation element 150 and are incident again on the cylindrical mirror 140 which directs the beams in the y-dimension onto the optical phased-matrix coupling (OPMC) means (in the preferred embodiments this is a liquid crystal on silicon spatial light modulator (LCOS SLM)) 180.

The projection on the OPMC comprises two groups of spatially separated wavelength channels, one group 185 being on the upper half (in the x-dimension) of the OPMC corresponding to beams originating in the v-polarisation state, and the second group 186 being on the lower half of the OPMC corresponding to beams originating from the h-polarisation state at the fibre input ports. The wavelength channels are separated spatially in the y-dimension and the image of each wavelength channel appears substantially as being highly asymmetric with orthogonal dimensions of 20 μm in the now focused y-dimension and approximately 700 μm in the collimated x-dimension. The individual wavelength channels from the input fibre ports can be accessed by the OPMC 180 independently of any of the other channels, and the orthogonal polarisation states of any particular wavelength channel can also be addressed individually. This offers the ability to be able to control the efficiency of the reflected beams from the OPMC in either polarisation and hence compensate for polarisation dependent loss on any particular channel that may exist in the input beams.

Figure 5:
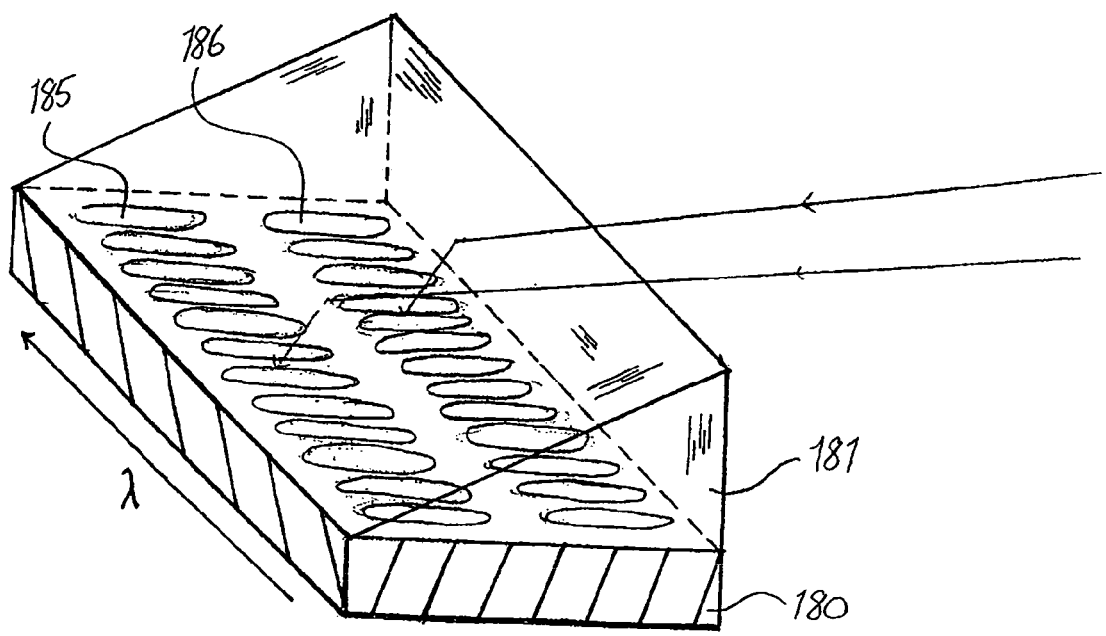
FIG. 5 is a close-up view of an OPMC device with a folding prism to allow for simplified mounting of the device.

In an alternative embodiment of the system, the mounting of the OPMC device 180 can be simplified as illustrated in FIG. 5 by folding the beams downwards (in the −x-dimension) by a prism 181 to allow simple mounting of the OPMC.

Returning to FIG. 3, the OPMC is positioned at or near the focal point of the light in the y-dimension being focused by cylindrical lens 140, which coincides with the telecentric or Fourier plane of the collimated light in the x-dimension. This situation results in a 4-f (8-f for the complete return path) optical system for light in the y-dimension and a 2-f (4-f for the complete return path) optical system for light in the x-dimension. Thus, light in the y-dimension, when it retraces its path back through the optical system, it is focused in the same plane as the optical fibre ports. Conversely for light in the x-dimension, a complete inversion of the magnification occurs such that the focal position of the light at the fibres is inverted about the centre line (i.e. between fibre ports 102 and 103).

The OPMC device 180 is able to couple any one independently or all the wavelength channels from the input port 102 or the add port 101 to either the drop port 104 or the express port 103. This coupling is achieved by inducing a phase hologram on the OPMC at each of the wavelength channels of the correct order to impart onto the beam the required amount of phase front correction to partially recreate the phase front of a beam which would approximately retrace its path through the system to be re-imaged on the desired output fibre port. Simultaneously when the input light from the input port 102 is directed to the drop port 104 at a particular wavelength the same wavelength will be directed from the add port 101 to the express output port 103. The technique used to create the phase hologram on the OPMC will be described later in detail.

The re-imaged light at the output fibre port is again largely circularly symmetric as the effects of the cylindrical lenses and polarisation equalisation elements are reversed through the return propagation. Channel by channel control of optical power can be achieved by exciting a fraction of the power into an angle that doesn't correspond to an active port hence attenuating the power in the chosen path.

Device 2

Figure 6:
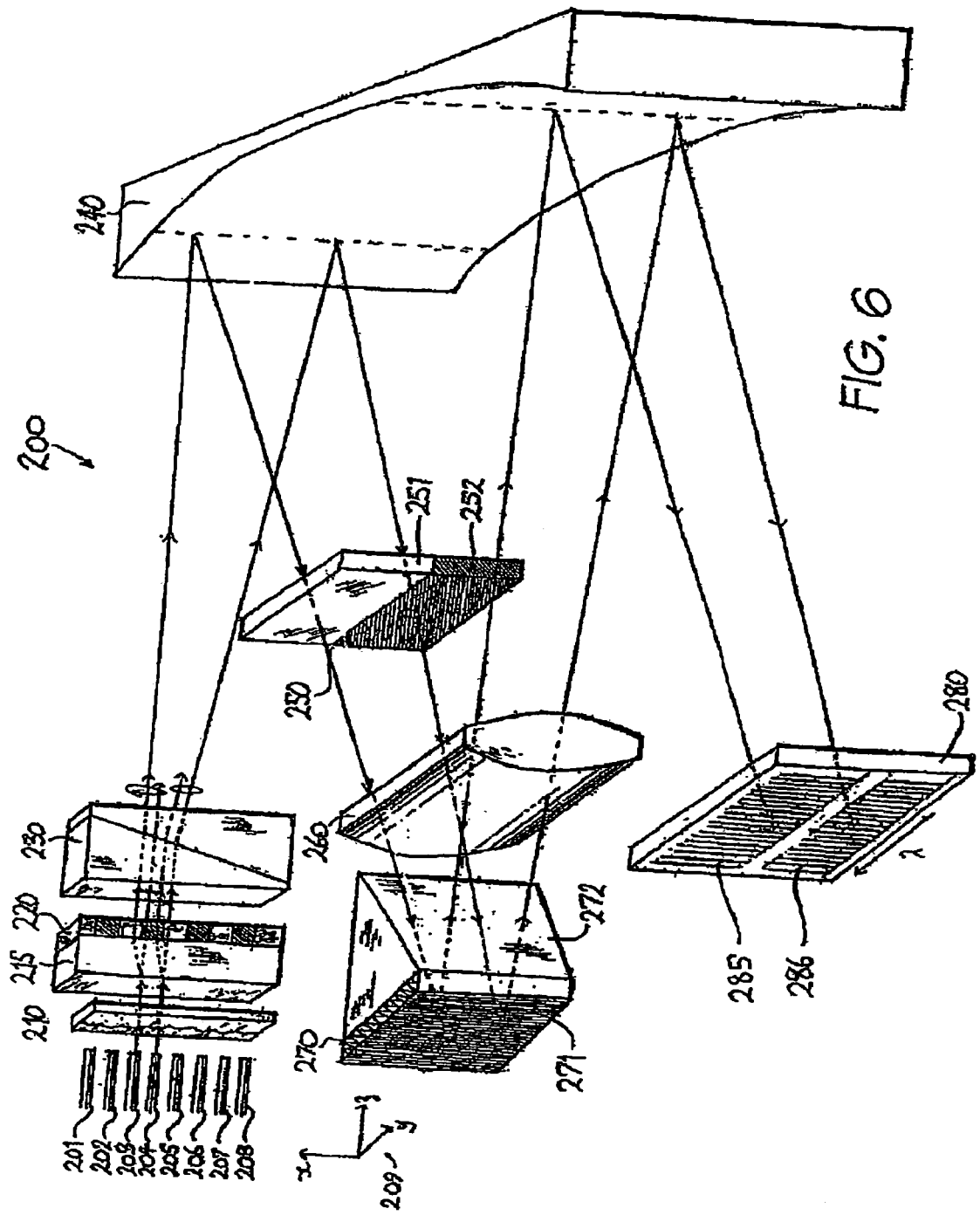
FIG. 6 is a schematic view of a second embodiment of a dual-source optical wavelength processor in accordance with the present invention.

A second embodiment 200 is shown in schematic perspective view in FIG. 6 wherein the operation of all the elements with similar numbers as elements in FIG. 3 (eg 130 and 230) is equivalent. This embodiment 200 displays a multiple of functionalities for each device such as wavelength switching and channel by channel power control, wavelength blocking etc. Clearly a subset of these functionalities could be achieved such as a pure wavelength blocker device.

In the preferred embodiment the input and output ports consist of 8 fibres (201-208) where the light from the odd-numbered fibres 201, 203, 205 and 207 are directed to a ROADM in one direction (ROADM1) and the even-numbered fibres 202, 204, 206 and 208 are directed to a second ROADM (ROADM2) operating independently of the first to be utilised in a second direction. The fibres are all aligned vertically in what will be referred to as the x-dimension and separated by about 250 µm. The fibres consisting ROADM1 include a first input port 203, a first output port 205, a first add port 201 and a first drop port 207. The fibres consisting ROADM2 include a first input port 204, a first output port 206, a first add port 2 and a first drop port 208.

The output from the fibres undergoes adjustment of the NA via the spherical microlens array 210 in an equivalent manner as element 110 in the description of Device 1 above and is again split into orthogonally polarised beams by a walk-off crystal 215. The result of the walk-off crystal in this case is to generate 16 beams separated by 125 µm with polarisation states alternating between the v- and the h-polarisation.

The beams then enter a polarization diversity optical element 220. Element 220 is a plate of λ/2 thickness (92 µm) for light with a wavelength of 1.5 µm and is constructed from alternating regions 221 and 222 of glass and crystal quartz respectively. The glass regions do not affect the polarisation state of the beam passing through it, whereas the quartz regions act as a λ/2 waveplate and consequently rotate the polarisation axis by 90° (between the x- and y-directions). To achieve this, the optical axis of the pieces 222 are rotated 45° with respect to the optical axis of the system.

Figure 7:
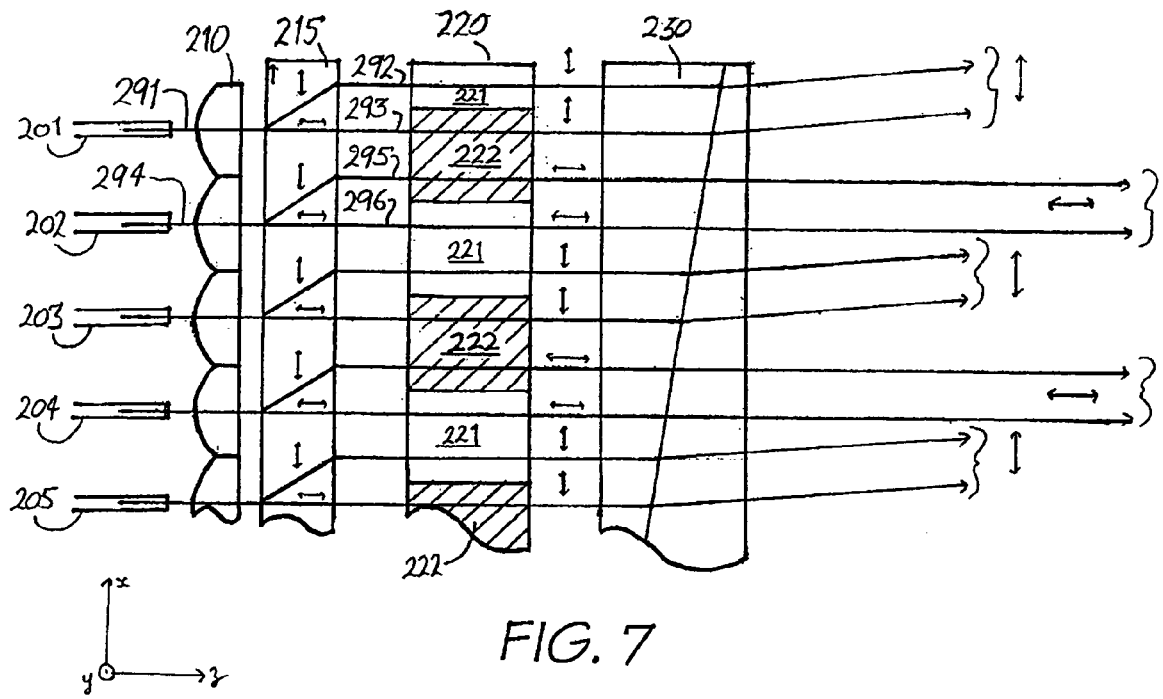
FIG. 7 is a detail schematic view of a first embodiment the front end polarisation tagging mechanism of the second embodiment.

Turning to FIG. 7, there is shown the first 5 fibre ports 201-205, the NA modifying optical power microlens array 210, the birefringent walk-off element 215, the composite waveplate 220 and the CBRW 230 to show in detail the polarisation tagging architecture in more detail. An output beam 291 from fibre 201 is split into two beams 292 and 293 by element 215, where beam 292 is in the vertical or v-polarisation state and beam 293 is in the horizontal or h-polarisation state. The optical element 220 is shown as comprising of a first glass waveplate of height 125 µm followed by alternating regions of quartz and glass with heights of 250 µm. Beam 292 next passes through a glass region 221 of element 220 which does not alter the polarisation state and beam 293 passes through a quartz region 226 of element 220 which rotates the plane of polarisation by 90° into the v-polarisation. Beams 292 and 293, being all of the output from fibre port 201, are now both in the v-polarisation state. Looking now at the output beam 294 from fibre port 202 after being similarly separated into two subsequent beams 295 and 296 by element 215, the v-polarised beam 295 passes through a quartz region 222 of element 220 and is rotated into the h-polarisation state, whereas the undeviated h-polarised beam 296 passes though a glass region 221 as such is unchanged. All the output from fibre port 202 is now in the h-polarisation state. This sequence is repeated for each alternate fibre port such that the output from all the odd-numbered ports 201, 203, 205 and 207 corresponding to ROADM1 are output from 220 in the v-polarisation state and all the outputs from the even-numbered fibre ports 202, 204, 206 and 208 corresponding to ROADM2 are in the h-polarisation state. The now polarisation tagged beams enter the CBRW 230 to impart an angular offset on the beams in one polarisation state with respect to the other. This offset is again in the vertical or x-dimension. In other embodiments, element 230 can be a simple, non-compensating element, however this would correspond to unequal path lengths resulting in a spatial offset between say a beam emitted from fibre input port 201 and re-imaged to the output port 207 of approximately 40 µm, affecting the overlap efficiency of the re-imaged light onto the express output or drop fibre ports.

Figure 8:
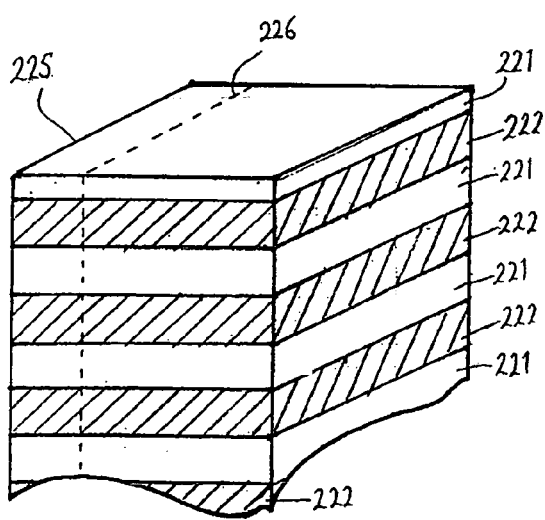
FIG. 8 shows a cutaway stack of alternating glass and quartz plates for constructing the first embodiment of a polarisation equalisation element for polarisation tagging.
Figure 9:
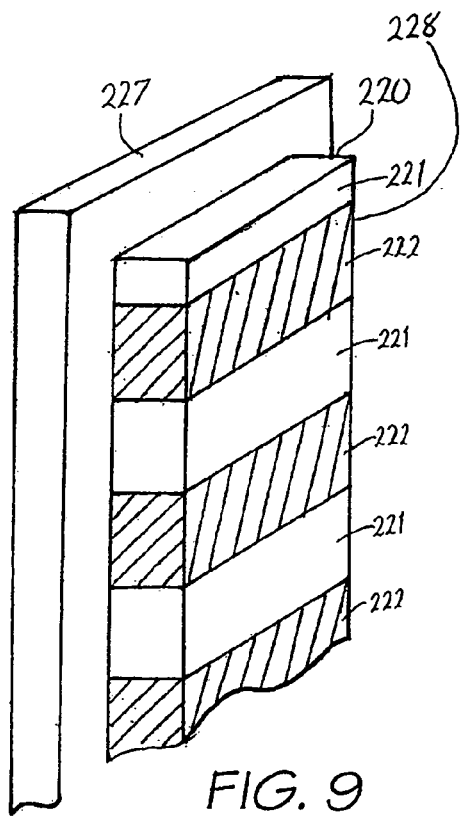
FIG. 9 is a cutaway of the first polarisation equalisation element mounted to a substrate for polishing to the required thickness.

The composite waveplate 220 can be constructed by first bonding alternating sheets each having thickness of about 250 µm as shown in FIG. 8. The front face 225 of the stack is polished to an optical quality finish and then cut transversely to the direction of the sheets along line 223. The cut piece is then attached to a substrate 227 as shown in FIG. 9 and polished on the cut face 228 to be the required thickness for a λ/2 waveplate at 1.5 µm (92 µm). The composite waveplate is finally removed from the substrate 227. Such waveplates can be produced by nano-optic lithographic techniques (as supplied by Nano Opto Corporation of Somerset, N.J. USA) or by an arrangement of standard quartz waveplate techniques as described above.

Referring back to FIG. 6, the beams from the input ports are next projected to a first cylindrical mirror 240 with optical power in the y-dimension and a focal length of 5 cm which provides collimation in the y axis. The angular misalignment between the v-polarised and h-polarised beams is unaffected and continues to separate spatially. The beams are then projected onto polarisation equalisation element 250 where again, the spatially separated v- and h-polarisations strike 250 in the upper 251 and lower 252 halves respectively. After the element 250, to the polarisations of the beams are equalised for efficient operation of the wavelength dispersing element and the OPMC.

The beams are then directed to the cylindrical lens 260 having optical power in the x-dimension with a focal length of 20 cm before being incident on a wavelength dispersive element shown as grism element 270 aligned at near-Littrow condition and having diffraction grating 271 and wedged prism 272. In other embodiments of the system, the wavelength dispersive element can again be a simple grating operating in the near-Littrow reflective state for the 1.5 .mu.m wavelength of the light (1200 lines/mm) emerging from the input fibre ports, however the grism embodiment adds significant advantages to the efficiency of the system as previously described.

The now wavelength-dispersed beams then pass back through the prism element of the grism 270 and again are passed through the cylindrical lens 260. After the second pass of the x-dimension lens the now diffracted beam is collimated in the x direction—the combined effect of the double pass of the lens 260 being a lens with focal length of approximately 10 cm, being twice the focal length of the first cylindrical mirror 240. This condition ensures that the grating acts in the telecentric or Fourier plane of the beams in the y-dimension.

On exiting from the cylindrical lens 260 the now collimated and spatially separated (in the x-dimension) beams pass by the polarisation equalisation element 250 and are incident again on the cylindrical mirror 240 which focuses the beams in the y-dimension onto the liquid crystal spatial light modulator (OPMC) 280.

In practise it may be difficult to efficiently place element 250 into the beam path such that the beams only interact with it before striking the grism and not afterwards as well since:
   a) the beams have significantly expanded at this point; and
   b) the beams after the grism element are now angularly dispersed in the y-dimension.

To correct this deficiency, it is possible to utilise a non-reciprocal composite element (either 350 of FIG. 11 or 450 of FIG. 12) incorporating a Faraday rotator and allow the beams to pass through the element twice in each direction.

Figure 10:
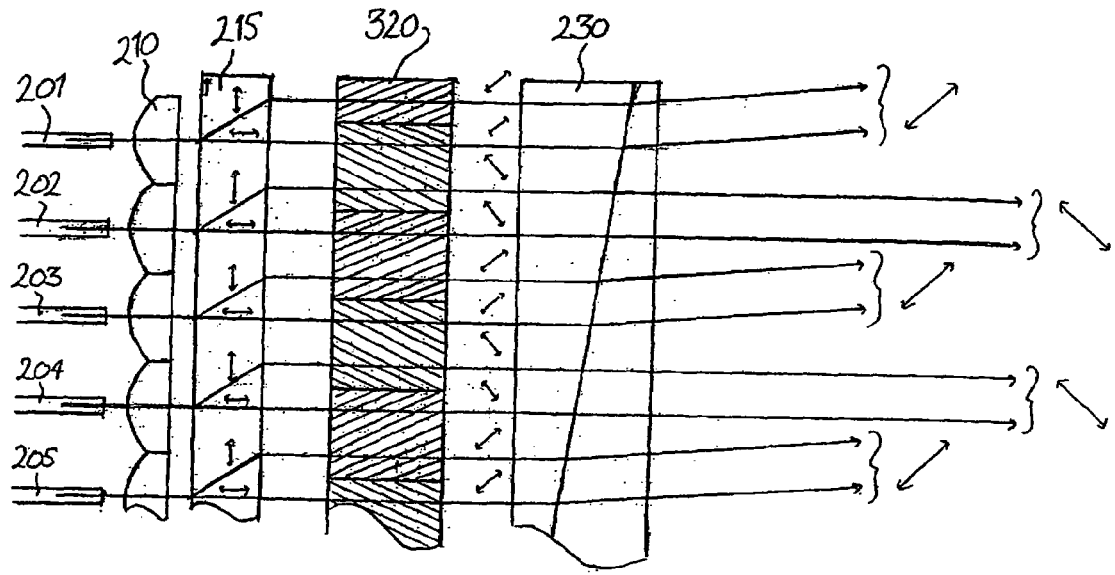
FIG. 10 is cutaway detail schematic view of a second embodiment the front end polarisation tagging mechanism of the second embodiment.
Figure 11:
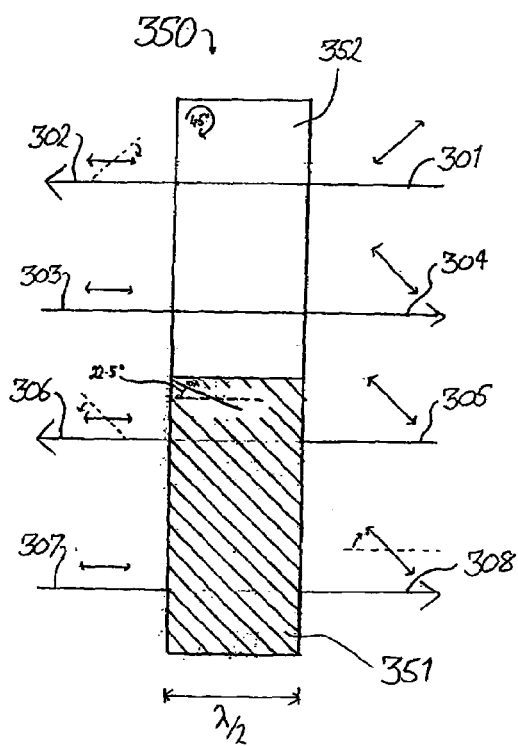
FIG. 11 is a first embodiment of a non-reciprocal polarisation equalisation element.

The first non-reciprocal embodiment of element 250 is shown in FIG. 11 as a composite $\lambda/2$ waveplate 350 similar to that of element 150 or 250, where however the bottom half 351 is a birefringent material such as quartz which has its optical axis at 22.5°, and the upper half 352 is a Faraday rotating material. In order to utilise this device the polarisation equalisation element 220 needs to be replaced with the alternative element 320 shown in FIG. 10. Element 320 is similarly constructed to 220, however all of the alternate regions are a birefringent material such as quartz with the optical axes alternately oriented to be ±22.5°. This has the effect of rotating the polarisation state of an incident beam by ±45' on traversal of the $\lambda/2$ waveplate. This result in the odd-numbered fibres corresponding to ROADM1 being tagged with a polarisation state of +45°, and the even-numbered fibres corresponding to ROADM2 being tagged with a polarisation state of −45°. Additionally, the CBRW 30 must be rotated about the z-axis to align with the polarisations states thus imparting the angular multiplex between the tagged beams in the correct direction. Returning again to FIG. 11, beams 301 from ROAMD1 with polarisation +45° is incident on 352 and which exiting 302 has been rotated 45° clockwise (cw) to be in the h-polarisation state for efficient diffraction by the grism element. The polarisation state is unchanged on reflection 303 and on the second pass through element 352 it is again rotated 45° cw to emerge 308 in the −45° polarisation state. Conversely, beams 305 from ROADM2 with polarisation −45° incident on element 351 and are rotated 45° counter-clockwise (ccw) to be in the h-polarisation state 306 on exiting for efficient diffraction by the grism element. Again, the polarisation state is unchanged on reflection 307 and on the second pass through 351 it is rotated cw 45° to be in the −45° polarisation 308. Beams from both ROADMs are now in the same polarisation state and the OPMC can be aligned accordingly to achieve efficient diffraction of the beams.

Figure 12:
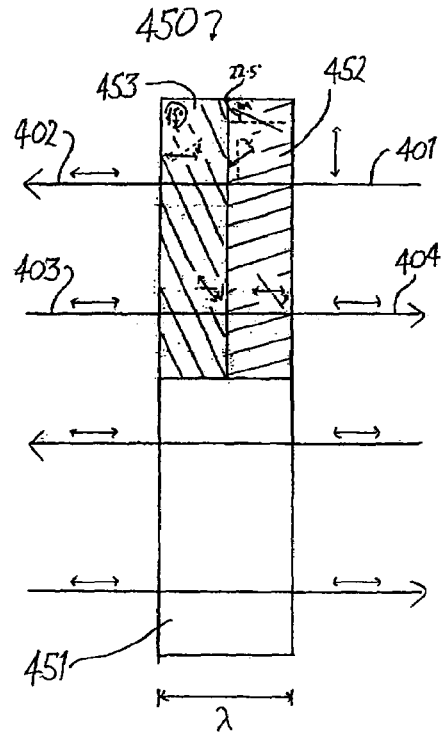
FIG. 12 is a second embodiment of a non-reciprocal polarisation equalisation element.

In a second embodiment of a non-reciprocal polarisation equalisation element to replace element 250, a composite $\lambda/2$ waveplate 450 such as that shown in FIG. 12 can be utilised. In this embodiment, no other changes need to be made in the optical system, such that elements 220 and 230 can be as shown in FIG. 6. The lower half 451 of the element 450 is simple glass and as such has no effect on the polarisation of the light passing through it in either direction. The upper half however is constructed of two elements in series:
   a) a birefringent material 452 such as quartz with its optical axis rotated at an angle of 22.5° and thickness $\lambda/2$ such that beam passing though it are rotated in a reciprocal manner by 45°; and
   b) a Faraday rotating material 453 of $\lambda/2$ thickness that rotates the polarisation state of the light by +45° (cw) in a non-reciprocal manner.

Thus, light from ROADM1 401 which strikes element 452 with polarisation in the vertical direction has its polarisation rotated by +45° where it then strikes element 453 where the polarisation is rotated a further 45° to emerge 402 in the horizontal polarisation state before striking the grism.

On the return path after the grism, the light 403 firstly strikes element 453 where it is rotated by 45° cw to be in the −45° polarisation state, and next strikes element 452 where the polarisation is then rotated ccw to emerge in the horizontal polarisation state. Beams from both ROADMs are again now in the same polarisation state for efficient operation of the OPMC.

Returning to FIG. 6 the projection onto the OPMC comprises of two groups of spatially separated wavelength channels, one group 285 being on the upper half (in the x-dimension) of the OPMC corresponding to beams from the input fibre ports of ROADM1, and the second group 286 being on the lower half of the OPMC corresponding to beams from the input fibre ports of ROADM2. The wavelength channels are separated spatially in the y-dimension and the image of each wavelength channel appears substantially as being highly asymmetric with orthogonal dimensions of 20 µm in the now focused y-dimension and approximately 700 µm in the substantially collimated x-dimension. The individual wavelength channels from either ROADM1 or ROADM2 can be accessed by the OPMC 280 independently of any of the other channels.

The OPCM 280 is positioned at approximately one focal length from the cylindrical lens 240, which coincides with the telecentric or Fourier plane of the collimated light in the x-dimension. This situation results in a 4-f (8-f for the complete return path) optical system for light in the y-dimension and a 2-f (4-f for the complete return path) optical system for light in the x-dimension. Thus, light in the y-dimension, when it retraces its path back through the optical system, is focused in the same plane as the optical fibre ports. Conversely for light in the x-dimension, a complete inversion of the magnification occurs such that the focal position of the light at the fibres is inverted about the centre line (i.e. between fibre ports 204 and 205). However, since in the present system alternate fibre ports are tagged with alternate polarisation states, such that each of the fibres located at equal distances from the centre line of the fibre port array is tagged with an orthogonal polarisation and no light from the other fibre port will be imaged onto its magnification equivalent since the polarisation equalisation elements in the system will only re-image the light back onto a fibre port if it is of the correct polarisation. This polarisation tagging architecture thus has the significant advantage of eliminating cross-talk between the two ROADMs since the interconnected fibre ports are twice the distance between the individual fibres of the total fibre array, and any light from either of the ROADM devices that appears onto the path of the other is lost to the space between the fibres due to the fact that it will be of incorrect polarisation and will not be combined in the walk-off crystal 215.

The OPMC 280 is able to direct the image of any one wavelength channel independently or all the wavelength channels from the input fibres between the drop ports, either fibre ports 207 or 208, or the express ports, either fibre ports 205 or 207, for either of ROADM1 or ROADM2 respectively. This is achieved by inducing a phase hologram at each of the wavelength channels of the correct order to impart onto the beam the required amount of phase front correction to retrace its path through the system and be re-imaged on the desired output fibre port. Simultaneously when the input light from the input port 203 of ROADM1 is directed to the drop port 207 at a particular wavelength, the same wavelength will be directed from the corresponding add port 201 to the express output port of ROADM1 205. Similarly for ROADM2, when the input light from the input port 4 of ROADM2 is directed to the drop port 208 at a particular wavelength the same wavelength will be directed from the corresponding add port 202 to the express output port 206 of ROADM2. The re-imaged light at the fibre port is again largely circular symmetric as the effects of the cylindrical lenses and polarisation equalisation elements are reversed through the return propagation. The operation of the OPMC device will now be described.

Description of the Optical Phased Matrix Coupling Device

The optical phased array coupling (OPMC) element in the preferred implementations is a liquid crystal on silicon (LCOS) device. Liquid crystal devices are commonly used for optical modulators. They have a number of advantages over mechanical modulators such as large modulation depths, no moving parts, low power dissipation, potential for large aperture operation and low cost. The LCOS device is a reflective device where a liquid crystal is sandwiched between a transparent glass layer with a transparent electrode and a silicon substrate divided into a 2-dimensional array of individually addressed electrodes. LCOS technology enables very high resolution devices with pixel pitch on the order of 10-20 µm, with each pixel being individually addressed by electrodes on the silicon substrate. The liquid crystals commonly used are dependent on the particular application, where ferroelectric liquid crystals (FLC) are preferred for devices requiring very fast switching times and phase modulations of less than $\pi/2$, and Nematic Liquid Crystals (NLC) are preferred for applications requiring pure phase modulations of up to $2\pi$ in reflection on a pixel-by-pixel basis. The LCOS systems in the preferred embodiments use NLCs. Such devices are available from Boulder Nonlinear Systems of Lafayette, Colo., USA.

The diffractive optical phased matrix can be thought of in terms of a diffraction grating formed by quantised multiple level phase grating set up by setting the amount of phase retardation on a pixel-by-pixel basis across the face of the beam to be routed. High efficiency of coupling and high isolation of switching states can be achieved through the use of a large number of elements in the phased matrix particularly in the axis of the x-dimension as is provided by the large size of the optical projection in that axis.

As described in the descriptions above, the image on the OPMC is that of two groups of spatially separated wavelength channels, one group being on the upper half (in the x-dimension) of the OPMC corresponding to beams that have been tagged with a first polarisation state, and the second group being on the lower half of the OPMC corresponding to beams that have been tagged with a second polarisations state, which is orthogonal to the first. Since the LCOS device is highly polarisation dependent, for efficient operation, the light from both groups of beams when they arrive at the device have been manipulated to be in the same polarisation state as previously described. The wavelength channels are separated spatially in the y-dimension and the image of each wavelength channel appears substantially as being highly asymmetric with orthogonal dimensions of 20 µm in the focused y-dimension and approximately 700 µm in the collimated x-dimension.

Due to the individually addressable nature of the LCOS pixels, the individual wavelength channels from either group of beams can be accessed by the OPMC 180 or 280 independently of any of the other channels. The OPMC device is divided into two series' of elongated cell regions substantially matching the elongated spatially separated wavelength bands. The cell regions each can include a plurality of drivable cells and wherein, in use, the cells are preferably driven so as to provide a selective driving structure which projects a corresponding optical signal falling on the cell region substantially into one of a series of output order modes.

One method of visualising the coupling of a particular wavelength channel to a desired output port is that particular wavelength channel occupies on the LCOS device form an optical phase matrix. This matrix is set up in such a fashion so as to recreate the phase of the required output port from the phase front of the input port which will now be described. In this embodiment, for simplicity the beams are assumed to be collimated in the x-axis with a linearly varying phase front though the required functions can be easily calculated for converging or diverging or distorted phase fronts wherein the OPMC will provide optical power and routing simultaneously.

Figure 13:
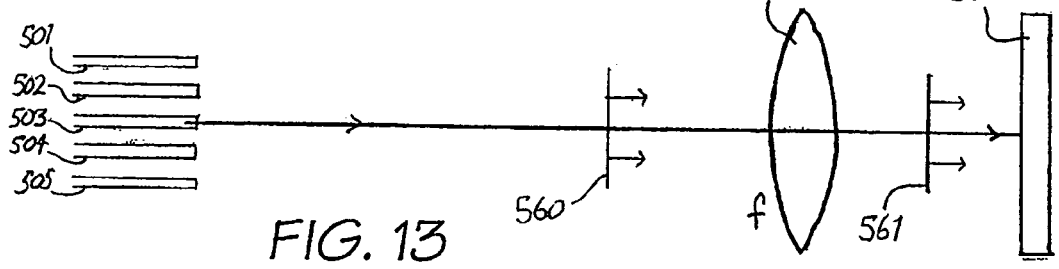
FIG. 13 is a schematic view of a forward propagating beam in the switching plane of an embodiment of the present invention.
Figure 14:
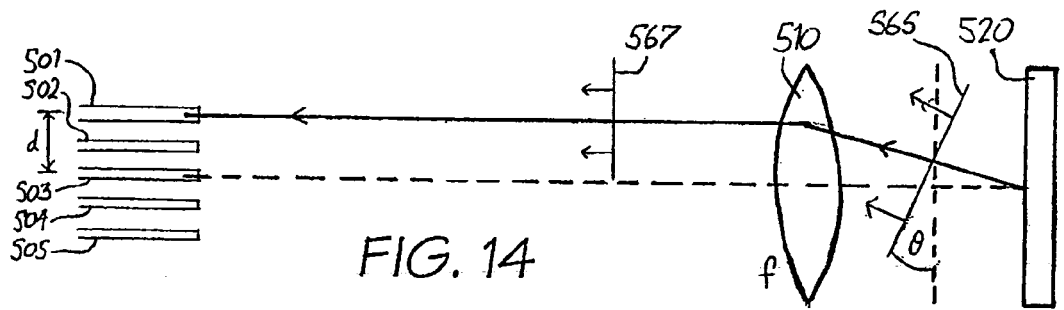
FIG. 14 is a schematic view of a backward propagating beam of an embodiment of the present invention showing the operation of the OPMC to impart a phase slope onto an incoming beam resulting in a displacement in the switching plane.

Referring to FIG. 13 and FIG. 14, the forward propagating beam from an optical fibre input port 503 is generated with a phase-front orthogonal to the direction of propagation. It passes through a lens 510 with a focal length f. The beam is still travelling in the same direction so the phase-front 561 strikes the OPMC device 520 in the plane of the device. To couple this beam into an optical fibre output port 501, the phase-front of the beam after reflection from the OPMC needs to have a phase front 565 which has a phase slope s with respect to the incoming phase-front 561 in the switching plane given in units of radians per micrometer. Thus, after passing again through the lens 510, the backward propagating beam has been displaced by a distance d with respect to the forward propagating beam, and so is incident on the output port 501. The phase slope s that is needed on the backward propagating phase-front to align with a particular output port is found by $$s = \tan^{-1}\left(\frac{d}{f}\right).$$

Figure 15:
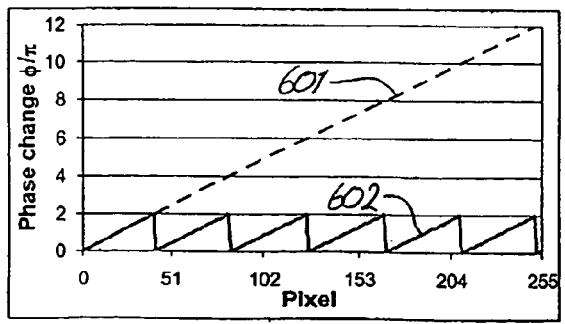
FIG. 15 is a graph showing the phase slope written on to the pixels of the OPMC to switch an incoming beam to a first output port.
Figure 16:
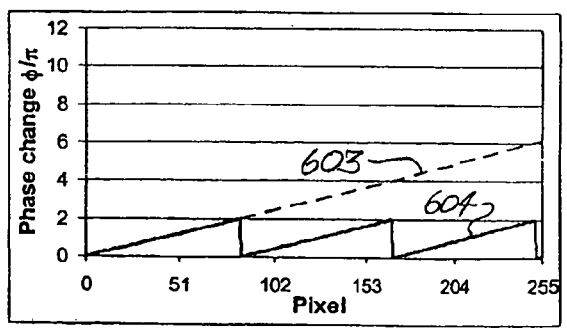
FIG. 16 is a graph showing the phase slope written on to the pixels of the OPMC to switch an incoming beam to a second output port.

This phase slope then needs to be converted into a phase shift on the individual pixels of the LCOS in the form of a voltage ramp in the plane of the elongated image of the wavelength channel on the OPMC device. The phase shift $\phi$ that each pixel needs to impart on the beam is calculated by $$\phi = \frac{2 \cdot \pi \cdot X \cdot Y \cdot s}{\lambda}$$

where X is the pixel width in µm, Y is the number of pixels, and λ is the wavelength of the channel in µm. The relationship between the phase shift imparted on the beam by each pixel and the voltage applied to that pixel is determined using a lookup table. This results in an increasing function of voltage (or phase change) with respect to the pixel number as seen by example in the dotted lines 601 and 603 of FIG. 15 and FIG. 16 respectively using 256 pixels. To limit the amount of voltage applied to the pixel, however, it is recognised that a phase shift of 2π is equivalent to a phase shift of 0, so each time the phase shift of a particular pixel reaches 2π, the voltage of the next pixel is reset to give a phase shift of zero and the ramp repeated. This is seen by the solid lines 602 and 604 in FIG. 15 and FIG. 16 respectively.

Channel by channel control of optical power can be achieved by exciting a fraction of the power into a mode that doesn't correspond to an active port hence attenuating the power in the chosen path.

A second way to visualise the coupling is to presume that the optical phased-matrix at a particular wavelength channel is set up in such a fashion so as to create an overlap integral between the input and the desired output ports of that particular wavelength channel. The spatial overlap integral of the input Electric field vector at the OPCM times modified by the applied phase of the OPMC with Electric field vector of the output fibre projection on the OPCM will provide a measure of the coupling efficiency between those ports. It is clear that the OPCM can be used to correct for optical aberrations in the system or deliberate optical aberrations can be introduced to suppress back reflections by suitable design of the optical phased-matrix. Additionally, control over the relative phase of the reflected light in each fibre is provided which could be usefully employed if the optical wavelength processor is used in interferometric applications.

In alternative embodiments the OPCM can provide part or all of the optical power required to allow refocusing of the beam in the y dimension. This can be calculated in an identical fashion as the OPCM only requires spatial overlap of the intensity of the beams to allow coupling to occur and is independent of the state of focus or collimation.

A significant benefit of the phased matrix approach with the LCOS device is that the efficiency of the overlap coupling efficiency can be controlled on a wavelength-by-wavelength basis by active control of the coupling or diffraction efficiency of the phase matrix. This can be achieved by coupling a known amount of the wavelength channel into a mode which does not correspond to an output port and as such, the light is lost to the system. In the same fashion, if desired, known portions of light in any particular group or wavelength channel can be coupled into more than one output fibre.

Although the invention has been described with reference to a specific example, it will be appreciated by those skilled in the art that the invention may be embodied in many other forms.

I claim:

1. An optical signal manipulation system including:
   a series of ports for carrying a series of optical signals to be manipulated;
   a spatial separating means for simultaneously spatially separating at least a first and a second group of light from said series of optical signals, each of said first and second group including a multiplicity of independent wavelength channels, with the wavelength channels of the first group having overlapping wavelength ranges of the wavelength channels of the second group;
   a wavelength dispersion element subsequently spatially separating the multiplicity of wavelength channels of said first and second group and projecting them onto a wavelength processing means; and
   wavelength processing means for separately processing each of the separated wavelengths of said first and second group, with each of wavelength channels of the first and second group being processed independently at a separated spatial location, said wavelength processing means having a series of independent wavelength processing elements, with separate wavelength processing elements simultaneously processing the wavelength channels having overlapping wavelength ranges of the first and second group.

2. A system as claimed in claim 1 wherein said spatial separating means includes a polarisation manipulation element separating a first and second series of predetermined polarisations from predetermined ones of said ports and projecting said first series in a first angular direction and the second series in a second angular direction.

3. A system as claimed in claim 1 wherein said spatial separating means includes a series of optical power elements offset from said ports separating at least a first and second series of predetermined optical signals from predetermined ones of said ports and projecting said first series in a first angular direction and the second series in a second angular direction.

4. A system as claimed in claim 1 wherein signals processed by said wavelength processing means are transmitted back through said wavelength dispersion element, said polarisation manipulation element for output at said optical signal ports.

5. A system as claimed in claim 4 wherein the particular port to which particular wavelength channels are output is determined by the processing carried out by said wavelength processing means.

6. A system as claimed in claim 4 wherein said wavelength processing means includes a series of zones and the wavelength processing means separately manipulates the phase front of light striking each of said zones in order to control the output destination of wavelength channels striking a particular zone.

7. A system as claimed in claim 6 wherein said wavelength processing means comprises a spatial light modulator having a plurality of independently addressable pixels with said pixels being manipulated in a predetermined manner so as to manipulate the phase front striking a corresponding zone.

8. A system as claimed in claim 1 wherein the optical signals received by said wavelength processing means are in the form of wavelength separated elongated bands.

9. A system as claimed in claim 8 wherein the wavelength separated elongated bands are substantially collimated along their major axis and substantially focused along their minor axis.

10. A system as claimed in claim 9 wherein the ratio of the width of the major axis to the width of the minor axis of the bands is equal to or greater than 5.

11. A system as claimed in claim 9 wherein the width of the bands major axis is substantially 700 microns and the width of a bands minor axis is substantially 20 microns.

12. A system as claimed in claim 8 wherein said first group of wavelength channels forms a first row of wavelength separated elongated bands and said second group of wavelength channels forms a second row of wavelength separated elongated bands.

13. A system as claimed in claim 12 wherein said first and second row are substantially parallel.

14. A system as claimed in claim 2 wherein said first series of predetermined polarisations is derived from orthogonal polarisations of a first series of optical signals and said second series of predetermined polarisations is derived from orthogonal polarisations of a second series of optical signals.

15. A system as claimed in claim 2 wherein said polarisation manipulation element comprises, in series, a polarisation separation element for spatially separating orthogonal polarisations, a polarisation alignment element for aligning the separated orthogonal polarisations and a polarisation deflection element for angularly deflecting an optical signal in accordance with the polarisation state of the signal.

16. A system as claimed in claim 1 wherein said first and second group include at least one wavelength channel of the substantially the wavelength.

* * * * *

UNITED STATES PATENT AND TRADEMARK OFFICE
CERTIFICATE OF CORRECTION

PATENT NO. : 7,397,980 B2  Page 1 of 1
APPLICATION NO. : 10/868521
DATED : July 8, 2008
INVENTOR(S) : Frisken It is certified that error appears in the above-identified patent and that said Letters Patent is hereby corrected as shown below:

Claim 16, column 22, line 17 should read as follows:

--...substantially the same wavelength...--

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,397,980 B2  Page 1 of 1
APPLICATION NO. : 10/868521
DATED : July 8, 2008
INVENTOR(S) : Frisken It is certified that error appears in the above-identified patent and that said Letters Patent is hereby corrected as shown below:

Claim 16, column 22, line 17 should read as follows:

--...substantially the same wavelength...--

Signed and Sealed this

Second Day of September, 2008

JON W. DUDAS
*Director of the United States Patent and Trademark Office*